United States Patent
Ku

(10) Patent No.: US 9,641,091 B2
(45) Date of Patent: May 2, 2017

(54) APPARATUS FOR INCREASING TRANSMISSION EFFICIENCY FOR DIRECT CURRENT ELECTRIC ENERGY

(71) Applicant: Bon Hun Ku, Gyeonggi-do (KR)

(72) Inventor: Bon Hun Ku, Gyeonggi-do (KR)

(73) Assignee: Bon Hun Ku, Gyeonggi-do (KR)

( * ) Notice: Subject to any disclaimer, the term of this patent is extended or adjusted under 35 U.S.C. 154(b) by 315 days.

(21) Appl. No.: 14/414,109

(22) PCT Filed: Jun. 13, 2013

(86) PCT No.: PCT/KR2013/005232
§ 371 (c)(1),
(2) Date: Jan. 11, 2015

(87) PCT Pub. No.: WO2014/010835
PCT Pub. Date: Jan. 16, 2014

(65) Prior Publication Data
US 2015/0171761 A1 Jun. 18, 2015

(30) Foreign Application Priority Data
Jul. 11, 2012 (KR) .................. 10-2012-0075583

(51) Int. Cl.
*H02M 3/335* (2006.01)
*H02J 1/02* (2006.01)

(52) U.S. Cl.
CPC ........... *H02M 3/33569* (2013.01); *H02J 1/02* (2013.01)

(58) Field of Classification Search
CPC ............................................. H02M 3/33569
See application file for complete search history.

(56) References Cited

U.S. PATENT DOCUMENTS

| 6,172,488 B1 * | 1/2001 | Mizutani | H02J 3/1814 323/207 |
| 7,663,348 B2 * | 2/2010 | Oohara | H02J 3/24 290/44 |
| 2014/0268896 A1 * | 9/2014 | Kurita | H01F 37/00 363/17 |

FOREIGN PATENT DOCUMENTS

| JP | H09-312934 A | 12/1997 |
| JP | H11-299104 A | 10/1999 |
| JP | 2010-183663 A | 8/2010 |
| KR | 10-2010-0082306 A | 7/2010 |

OTHER PUBLICATIONS

International Search Report for PCT/KR2013/005232.

* cited by examiner

*Primary Examiner* — Emily P Pham
(74) *Attorney, Agent, or Firm* — The PL Law Group, PLLC

(57) ABSTRACT

Disclosed herein is apparatus for increasing efficiency in transmitting direct electric (DC) energy. The apparatus includes a voltage stabilizer that includes, a wire connected to a power line for transmitting the DC electric energy; an electrical substance encircling the wire, an electromagnetic-field generating coil encircling the electrical substance at regular intervals in a direction perpendicular to the wire, the electromagnetic-field generating coil being connected to the wire, a voltage-stabilization circuit unit stabilizing voltage of the DC electric energy input into the apparatus before outputting the DC electric energy, and a connector connecting the power line to the wire.

7 Claims, 10 Drawing Sheets

US 9,641,091 B2

APPARATUS FOR INCREASING TRANSMISSION EFFICIENCY FOR DIRECT CURRENT ELECTRIC ENERGY

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2013/005232, filed Jun. 13, 2013, which claims priority to Korean Patent Application No. 10-2012-0075583, filed Jul. 11, 2012, entire contents of which are incorporated herein by reference.

TECHNICAL FIELD

The present invention relates to an apparatus for minimizing power consumption in transmitting direct current (DC) energy.

BACKGROUND ART

In transmitting DC electric energy, for example, in DC transmission, the power factor is always 1 because the DC electric energy has no frequency. There is no power loss attributable to a skin effect or corona loss. Furthermore, a required insulation level can be reduced. Since it is unnecessary to consider the reactance and phase angle of a power line, the stability is comparatively high and the power transmission capacity is not limited. In addition, short-circuit current is low, thus making connection of different frequency AC systems possible. Furthermore, there is little inductive interference.

Due to the above-mentioned reasons, high-voltage DC transmission is recently used; however, 100% of produced DC electric energy cannot be transmitted to a desired place because of problems with mechanism in transmitting power.

A power transmission system is required to transmit produced power to a desired place. The power transmission system uses a power line through which produced power is transmitted.

In such a power transmission system using a power line, 100% of produced power cannot be used in a desired place by because a power loss occurs on the power line.

At present, only about 80% of produced power can be used because of a power loss and reverse current that occur during transmission of power through the power line.

To make a high-efficiency power transmission system at low cost, it is necessary to reduce a power loss from the power line as much as possible.

SUMMARY

Accordingly, the present invention has been made keeping in mind the above problems occurring in the prior art, and an object of the present invention is to minimize a power loss from a power line when transmitting DC electric energy.

Another object of the present invention is to use techniques pertaining to transmission of electric current and controlling electrons that are the essence of electric current, rather than development of a coating technique or a technique pertaining to a module or material, and make it possible to enhance the efficiency in use of power without changing the existing equipment A further object of the present invention is to reduce a load in a power line that functions as a path for transfer of electrons and accelerate the transfer of electrons, thus reducing a power loss.

The above and other objects of the present invention will be more clearly understood from the following detailed description.

In order to accomplish the above objects, the present invention provides an apparatus for increasing efficiency in transmitting direct electric (DC) energy in a DC electric energy transmission system. The apparatus includes a voltage stabilizer. The voltage stabilizer includes: a wire connected to a power line for transmitting the DC electric energy; an electrical substance encircling the wire; an electromagnetic-field generating coil encircling the electrical substance at regular intervals in a direction perpendicular to the wire, the electromagnetic-field generating coil being connected to the wire; a voltage-stabilization circuit unit stabilizing voltage of the DC electric energy input into the apparatus before outputting the DC electric energy; and a connector connecting the power line to the wire.

The electrical substance may be made of a semiconductor and have a positive charge in an electromagnetic field formed by the electromagnetic-field generating coil. The electrical substance may make distribution of electrons in the wire uniform, thus stabilizing transfer of electric current flowing through the wire and the power line.

The voltage stabilizer may stabilize the electromagnetic field formed by the electromagnetic-field generating coil and stabilizes vibration of electrons due to spins of the electrons by means of the electrical substance, thus stabilizing transfer of the electrons and increasing efficiency in transmitting the DC electric energy.

The voltage-stabilization circuit unit may include: a voltage discrimination unit discriminating voltage of the DC electric energy input to the apparatus between a higher voltage than a preset reference voltage and a lower voltage than the reference voltage; a voltage conversion unit configured such that when the voltage is higher than the reference voltage, the voltage is dropped to a level equal to a level of the reference voltage, and when the voltage is lower than the reference voltage, the voltage is raised to the level equal to the level of that of the reference voltage; and a stabilized-voltage output unit configured such that when the voltage converted by the voltage conversion unit falls outside a predetermined range of the reference voltage, the voltage is returned, and when the voltage transformed by the voltage conversion unit falls within the predetermined range of the reference voltage, the voltage is output.

The voltage stabilizer may include an upper voltage stabilizer and a lower voltage stabilizer, wherein the upper voltage stabilizer and the lower voltage stabilizer have same charge and polarity as each other.

The voltage discrimination unit may include a condenser and a resistor and use a potential difference to discriminate an input voltage of the DC electric energy. The voltage conversion unit may include a first transformer and control the first transformer to raise the voltage when the input voltage of the DC electric energy is lower than the reference voltage and to drop the voltage when the input voltage of the DC electric energy is higher than the reference voltage. The stabilized-voltage output unit may include a second transformer and make the voltage output from the voltage conversion unit be output as a constant stabilized voltage.

The electrical substance may comprise an n-p type semiconductor formed by combination of an n-type semiconductor with a p-type semiconductor and control, using electrical characteristics, the flow of electrons in the wire and the power line, thus outputting a stabilized voltage.

The present invention can minimize a power loss in transmitting DC electric energy and thus enhance the efficiency of use of power without the need for developing or establishing new power generation equipment.

Furthermore, existing power generation equipment and power transmission systems can be used as they are. Therefore, the efficiency in use of power can be markedly enhanced at low cost.

Moreover, the present invention can be applied to all DC electric energy transmission systems, thus improving the energy efficiency of systems using DC electric energy.

DETAILED DESCRIPTION

The present invention will now be described in detail based on embodiments. The present invention may, however, be embodied in many different forms and should not be construed as being limited to only the embodiments set forth herein, but should be construed as covering modifications, equivalents or alternatives falling within ideas and technical scopes of the present invention.

The terminology used herein is for the purpose of describing particular embodiments only and is not intended to be limiting of the present invention. As used herein, the singular forms are intended to include the plural forms as well, unless the context clearly indicates otherwise.

Hereinafter, an embodiment of the present invention will be explained in detail with reference to the attached drawings.

Figure 1:
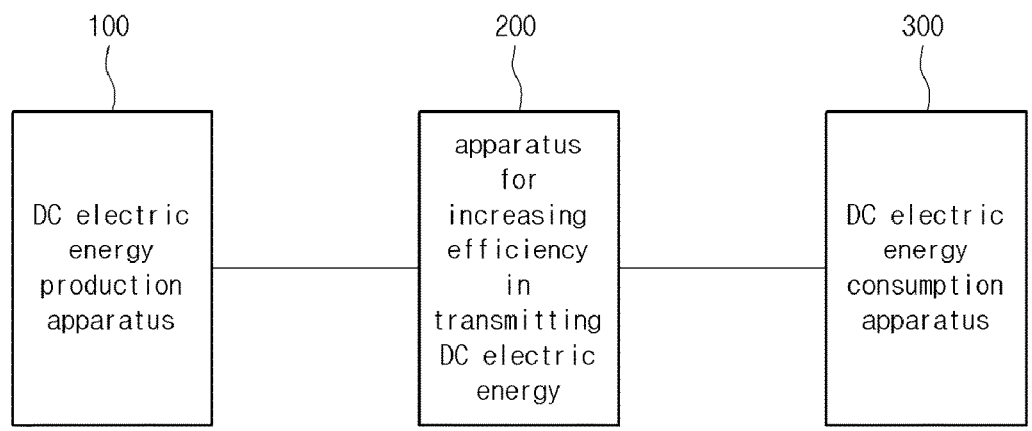
FIG. 1 is a view illustrating use of an apparatus for increasing efficiency in transmitting direct electric energy according to the present invention.

FIG. 1 is a view illustrating use of an apparatus for increasing efficiency in transmitting direct current (DC) electric energy according to the present invention.

The apparatus 200 for increasing efficiency in transmitting DC electric energy according to the present invention is disposed between a DC electric energy production apparatus 100 and a DC electric energy consumption apparatus 300.

The DC electric energy production apparatus 100 is a device for producing DC electric energy. For example, the DC electric energy production apparatus 100 may be a power plant such as a solar photovoltaic plant or a DC electric energy supply apparatus.

The DC electric energy consumption apparatus 300 may be any apparatus that consumes DC electric energy or an inverter that converts DC electric energy produced from a solar photovoltaic plant into alternating current (AC) electric energy so as to transmit the electric energy to a substation.

The efficiency increasing apparatus 200 according to the present invention is connected to a power line through which DC electric energy is transmitted.

The present invention uses the efficiency increasing apparatus 200 and stabilizes transmission of DC electric energy before transmitting the DC electric energy to the DC electric energy consumption apparatus or the inverter 300, thus enhancing the efficiency in transmitting DC electric energy.

Figure 2:
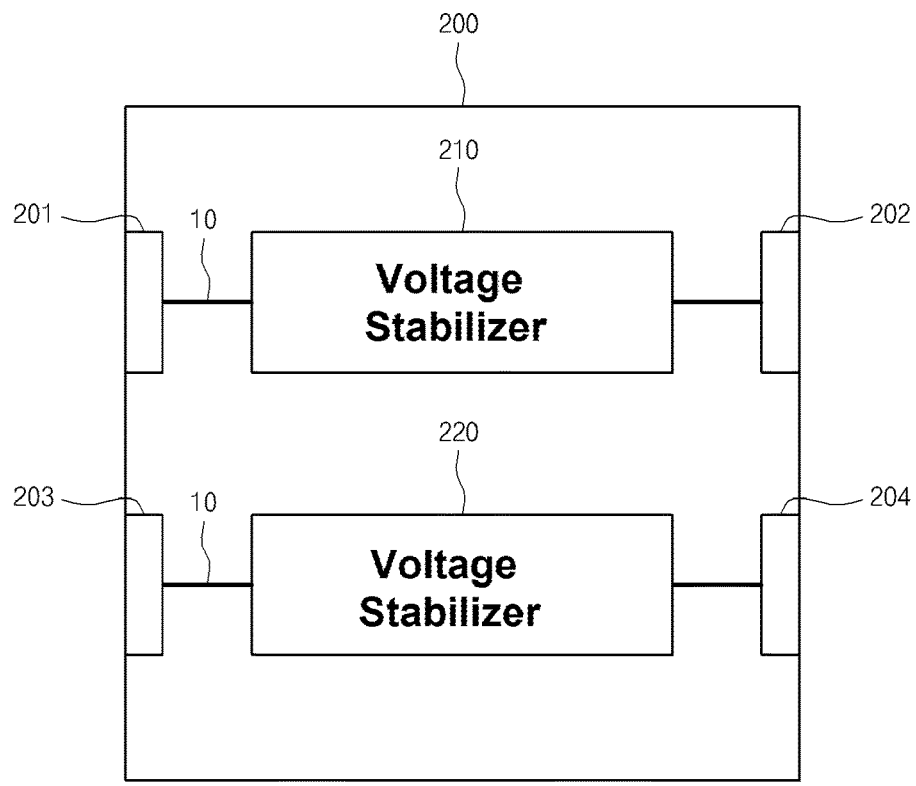
FIG. 2 is a view showing the construction of an apparatus for increasing efficiency in transmitting direct electric energy according to an embodiment of the present invention.

FIG. 2 is a view showing the construction of an apparatus for increasing efficiency in transmitting direct electric energy according to an embodiment of the present invention.

The efficiency increasing apparatus 200 according to the present invention includes connectors 201, 202, 203, and 204 connected to a power line, an electric wire 10 connected to the power line, and a voltage stabilizer 210, 220 for use in transfer of electrons and stabilization of voltage.

The connectors 201, 202, 203, and 204 connect the corresponding electric wire 10 provided in the efficiency increasing apparatus 200 to the power lines for transmitting DC electric energy.

DC electric energy is transmitted through the electric wire in the efficiency increasing apparatus 200. Transfer of electrons in the electric wire 10 can be stabilized by an electrical substance 211 and an electromagnetic-field generating coil 212.

Depending on the intensity of electric energy generated from the DC electric energy production apparatus 100, the voltage stabilizer 210, 220 may comprise one or more voltage stabilizers provided in the efficiency increasing apparatus 200.

In an embodiment of the present invention in which the apparatus 200 is connected to power lines for transmitting DC electric energy, the voltage stabilizer 210 comprises two voltage stabilizers that are provided in the DC electric energy production apparatus 100 at upper and lower positions and are respectively connected to positive and negative power lines.

Figure 3:
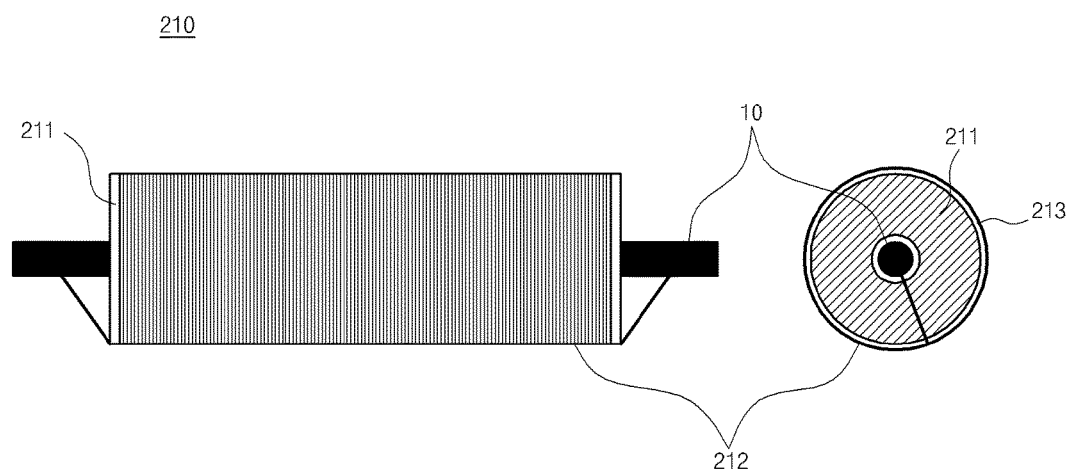
FIG. 3 is a view showing the construction of a voltage stabilizer according to an embodiment of the present invention.

FIG. 3 is a view illustrating the construction of the voltage stabilizer according to an embodiment of the present invention.

In FIG. 3, the construction of the voltage stabilizer 210 that is disposed at the upper position is illustrated as an example for explanation of the voltage stabilizer.

The voltage stabilizer 210 according to the present invention includes an electrical substance 211 and an electromagnetic-field generating coil 212 that encircle the electric wire 10.

The electric wire 10 is covered with uninsulated metal such as fluorine resin.

Furthermore, a coating layer 213 is applied between the electrical substance 211 and the electromagnetic-field generating coil 212.

The electrical substance 211 is made of a compound semiconductor including materials such as gallium arsenide (GaAs), gallium phosphide (GaP), cadmium sulfide (CdS), SiC, Si, CdSe, $MnFe_2O_4$, Cl, Al, Mg, etc., having semiconductive characteristics and is formed in such a way that a distribution rate of (ion) electrons in the outer shell is increased by structural bonding using the polarities in a bonding process of the compound semiconductor.

The magnetic moment of an electron is determined by the spin of electric charge, wherein a mixture of materials having the same polarity is further increased in polarity value. The polarity value plays a major role in controlling transfer of electric current, that is, vibration of electrons.

The electrical substance 211 according to the present invention uses a rectifying function in which an n-type semiconductor is attached to a p-type semiconductor so that electric current can easily flow from the p-type semiconductor to the n-type semiconductor, but it seldom flows in the reverse direction by an electromagnetic field.

The electromagnetic-field generating coil 212 is a coil encircling the electrical substance 211. The electromagnetic-field generating coil 212 encircles the electrical substance 211 at regular intervals in a direction perpendicular to the electric wire 10 so as to control an electric charge generation rate of the electric wire 10 uniformly.

The electromagnetic-field generating coil 212 is optimized such that the electric field is formed in the direction perpendicular to the electric wire 10 and the plane of the electrical substance 211, thus forming a conductive flat inductor such that the electromagnetic field and positive charge maintain a predetermined distance therebetween. In this way, a constant electric field is formed on the electric wire 10, whereby the value of electric charge moving along the electric wire 10 is maintained constant.

The electromagnetic-field generating coil 212 is connected to the electric wire 10.

Figure 4:
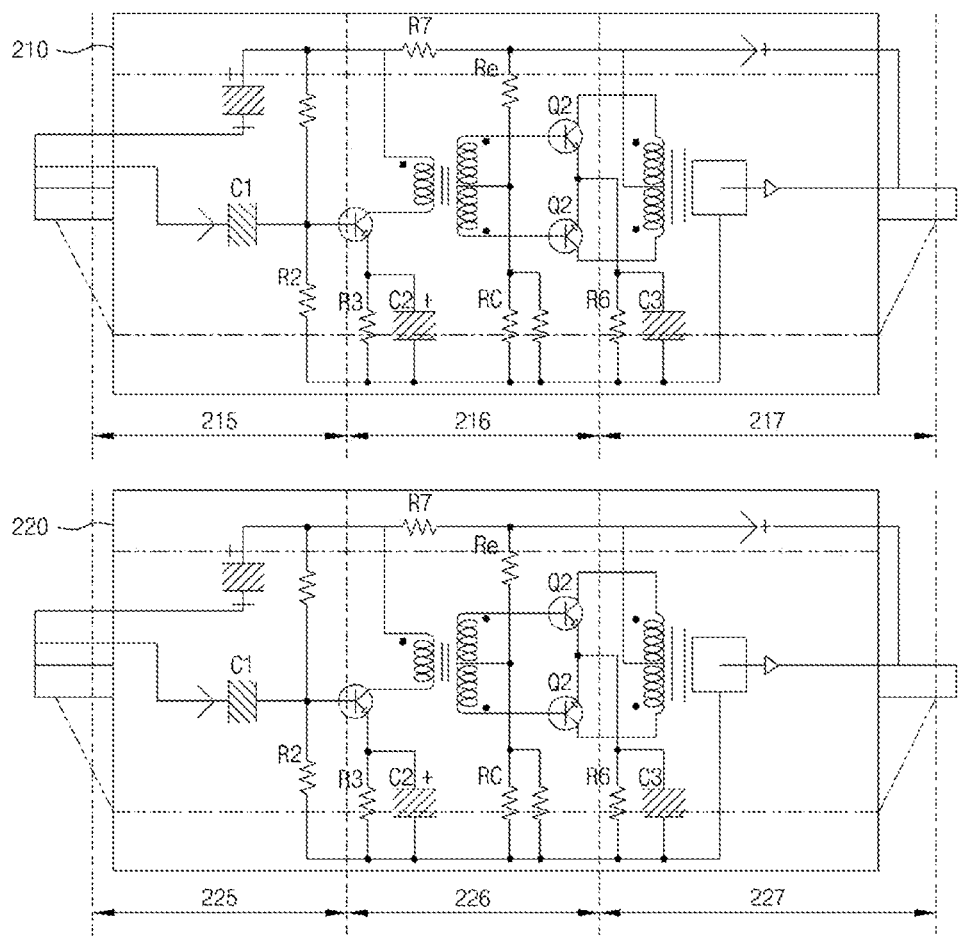
FIG. 4 is a view showing the construction of a voltage-stabilization circuit unit according to an embodiment of the present invention.

FIG. 4 is a view showing a circuit construction of a voltage-stabilization circuit unit according to an embodiment of the present invention.

The voltage-stabilization circuit unit includes voltage discrimination units 215 and 225, voltage conversion units 216 and 226, and stabilized-voltage output units 217 and 227.

Each voltage discrimination unit 215, 225 discriminates an input voltage of DC electric energy produced from the DC electric energy production apparatus 100, that is, an input voltage of DC electric energy input into the efficiency increasing apparatus 200, based on a reference voltage so as to determine whether the input voltage is higher or lower than the reference voltage.

For this, each voltage discrimination unit 215, 225 includes a condenser and a resistor and uses a potential difference to discriminate an input voltage of DC electric energy.

Each voltage conversion unit 216, 226 is operated such that when the input voltage is higher than the reference voltage, the voltage is dropped to the same level as that of the reference voltage; when the input voltage is lower than the reference voltage, the voltage is raised to the same level as that of the reference voltage.

To achieve the above purpose, the voltage conversion unit 216, 226 includes a first transformer and controls the first transformer to raise the voltage when the input voltage of the DC electric energy is lower than the reference voltage and to drop the voltage when the input voltage of the DC electric energy is higher than the reference voltage.

Each stabilized-voltage output unit 217, 227 is configured such that when the voltage transformed by the voltage conversion unit 216, 226 falls outside a predetermined range of the reference voltage, the voltage is returned; when the voltage transformed by the voltage conversion unit 216, 226 falls within the predetermined range of the reference voltage, the voltage is output.

For this, the stabilized-voltage output unit 217, 227 includes a second transformer and makes the voltage output from the voltage conversion unit 216, 226 be output as a constant stabilized voltage.

FIGS. 5 through 11 are views showing the results of tests in which the apparatus according to the present invention is used in a power line.

For the sake of explanation, a conventional power transmission system that does not use the efficiency increasing apparatus 200 of the present invention refers to 'A', and a power transmission provided with the apparatus of the present invention refers to 'B'.

Figure 5:
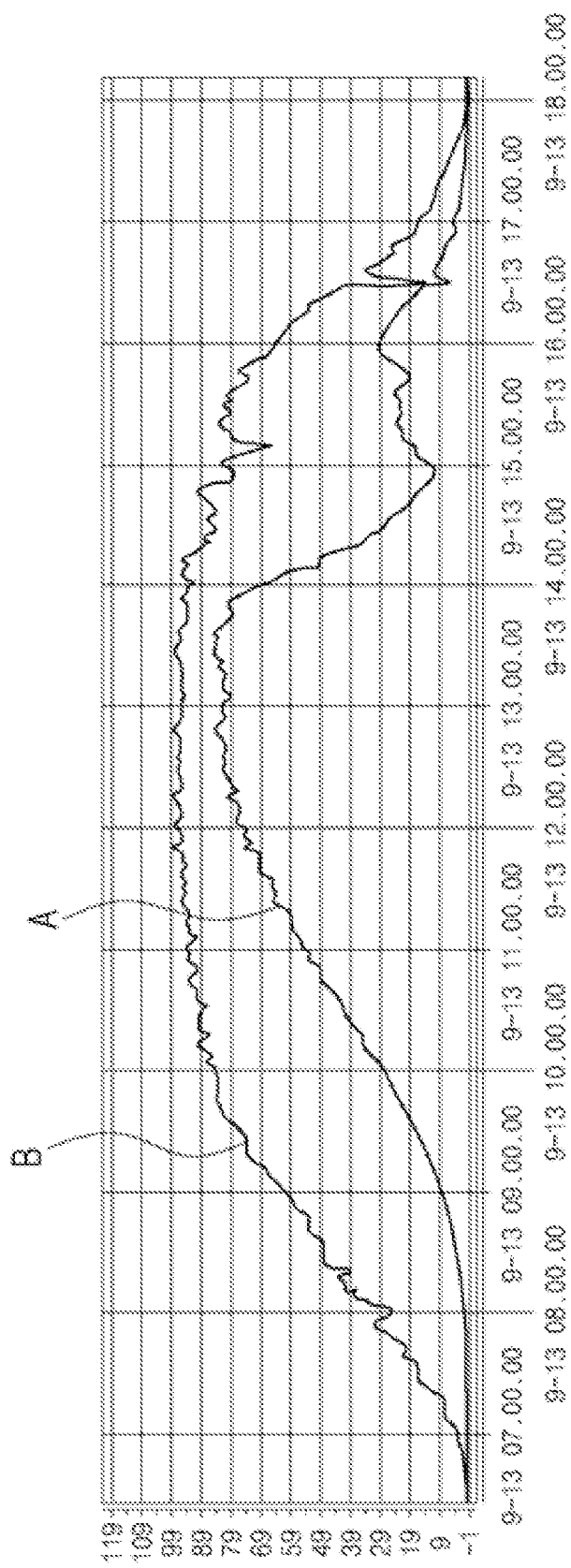
FIGS. 5 through 11 are views showing the results of tests in which the apparatus according to the present invention is used in a power line.

FIG. 5 is a graph showing the result of test 1 for comparing the efficiency in transmitting DC electric energy between before and after the efficiency increasing apparatus of the present invention is installed.

Referring to the graph of FIG. 5 showing the result of test 1, the maximum capacity of DC transmitted after the efficiency increasing apparatus 200 is used is up to about 99%, which is about 14% higher than about 85%, which is the maximum DC capacity when the efficiency increasing apparatus 200 is not used. In other words, it can be understood that the DC transmission efficiency was increased by at least 14%.

Figure 6:
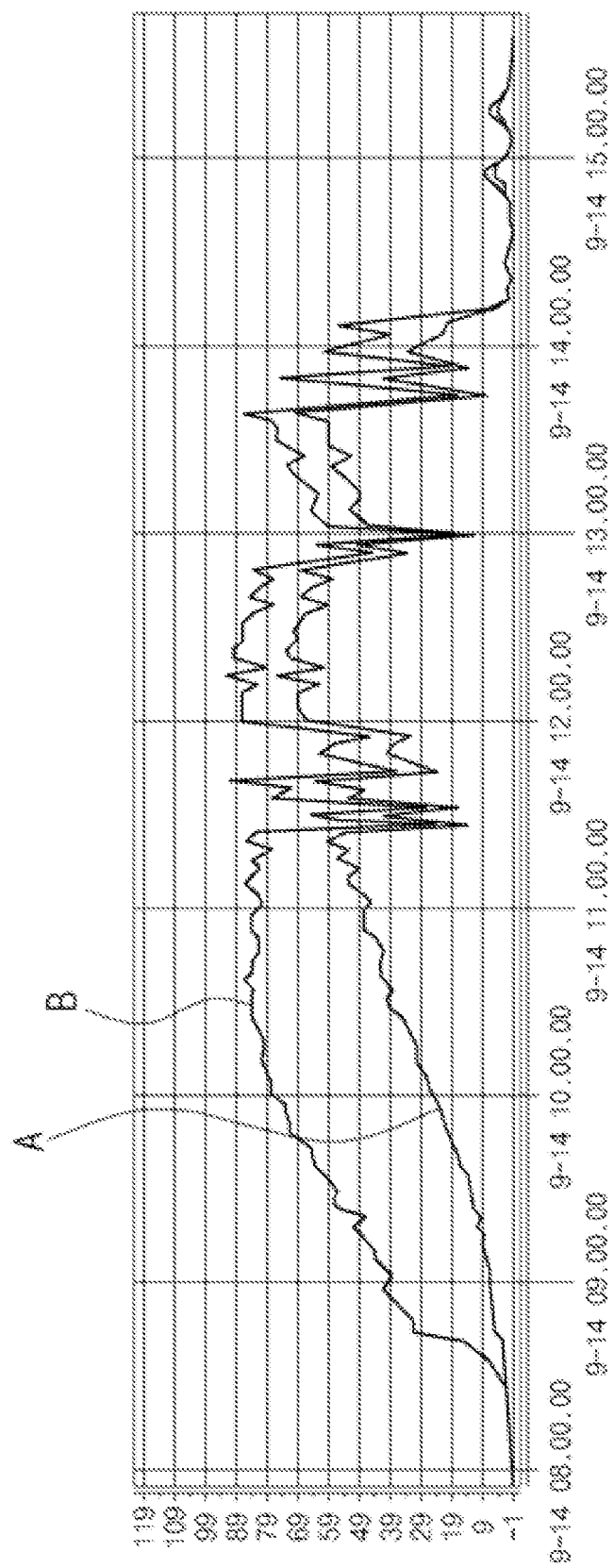

FIG. 6 is a graph showing the result of test 2 for comparing the efficiency in transmitting DC electric energy between before and after the efficiency increasing apparatus of the present invention is installed.

Referring to the graph of FIG. 6 showing the result of test 2, the maximum capacity of DC transmitted after the efficiency increasing apparatus 200 is used is up to about 90%, which is higher by about 12% than about 78%, which is the maximum DC capacity when the efficiency increasing apparatus 200 is not used. In other words, it can be understood that the DC transmission efficiency was increased by at least 12%.

Figure 7:
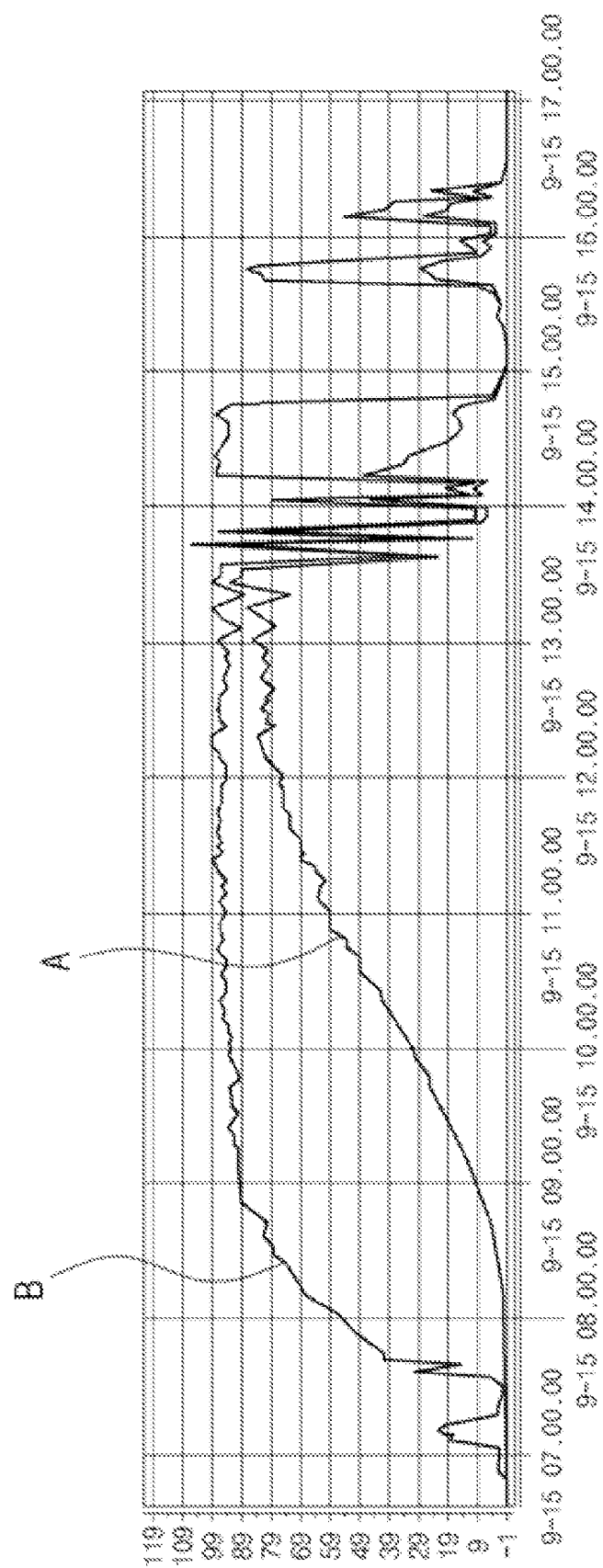

FIG. 7 is a graph showing the result of test 3 for comparing the efficiency in transmitting DC electric energy between before and after the efficiency increasing apparatus of the present invention is installed.

Referring to the graph of FIG. 7 showing the result of test 3, the maximum capacity of DC transmitted after the efficiency increasing apparatus 200 is used, is up to about 99%, except in a rapid current fluctuation section. This maximum capacity of 90% is higher by about 10% than about 89%, which is the maximum DC capacity when the efficiency increasing apparatus 200 is not used. In other words, it can be understood that the DC transmission efficiency was increased by at least 10%.

Figure 8:
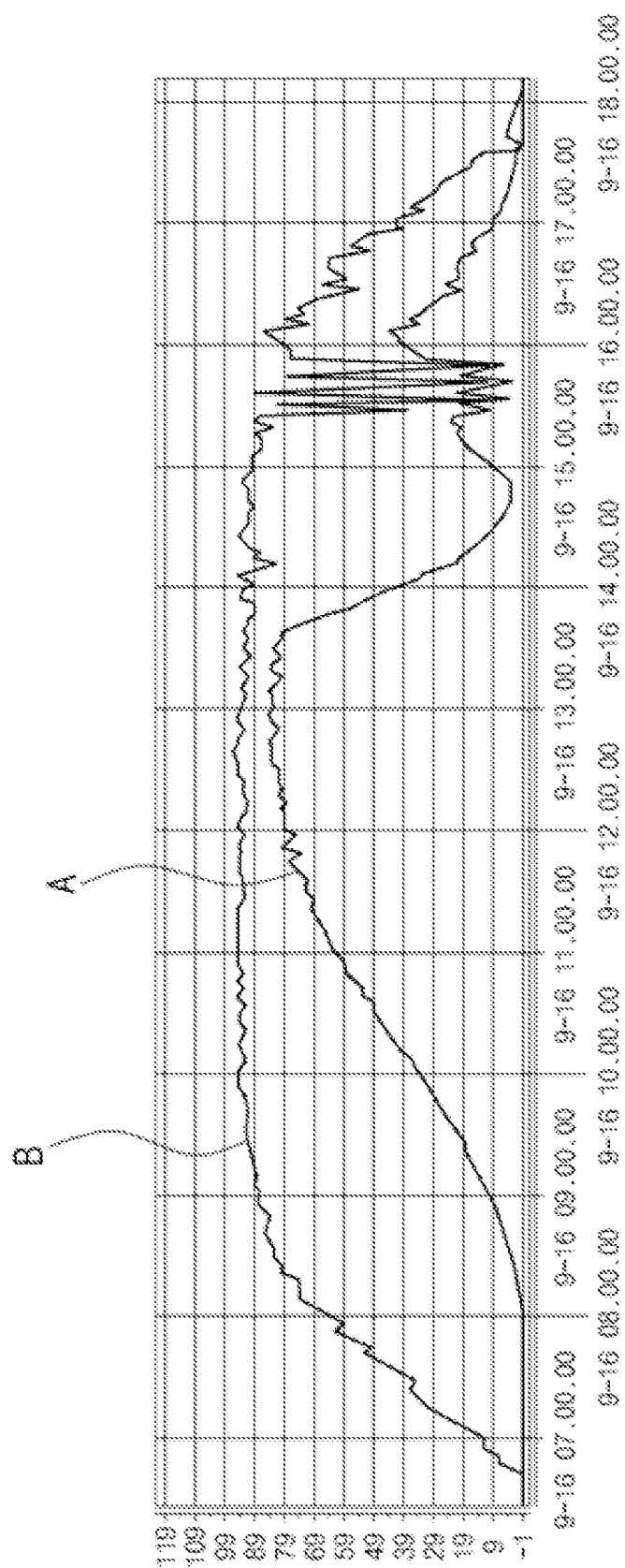

FIG. 8 is a graph showing the result of test 4 for comparing the efficiency in transmitting DC electric energy between before and after the efficiency increasing apparatus of the present invention is installed.

Referring to the graph of FIG. 8 showing the result of test 4, the maximum capacity of DC transmitted after the efficiency increasing apparatus 200 is used is up to about 97%, except in a rapid current fluctuation section. This maximum capacity of 97% is higher by about 12% than about 85%, which is the maximum DC capacity when the efficiency increasing apparatus 200 is not used. In other words, it can be understood that the DC transmission efficiency was increased by at least 12%.

Figure 9:
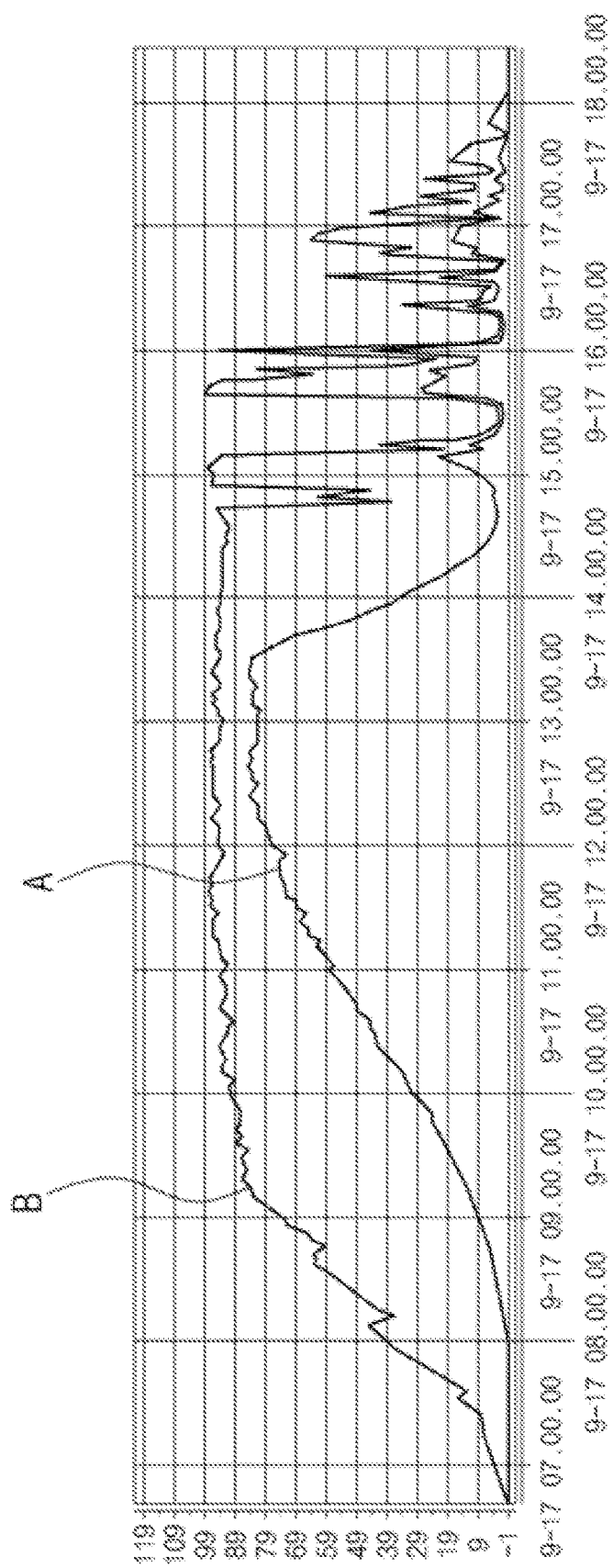

FIG. 9 is a graph showing the result of test 5 for comparing the efficiency in transmitting DC electric energy between before and after the efficiency increasing apparatus of the present invention is installed.

Referring to the graph of FIG. 9 showing the result of test 5, the maximum capacity of DC transmitted after the efficiency increasing apparatus 200 is used is up to about 97%, except in a rapid current fluctuation section. This maximum capacity of 97% is higher by about 12% than about 85%, which is the maximum DC capacity when the efficiency increasing apparatus 200 is not used. In other words, it can be understood that the DC transmission efficiency was increased by at least 12%.

Figure 10:
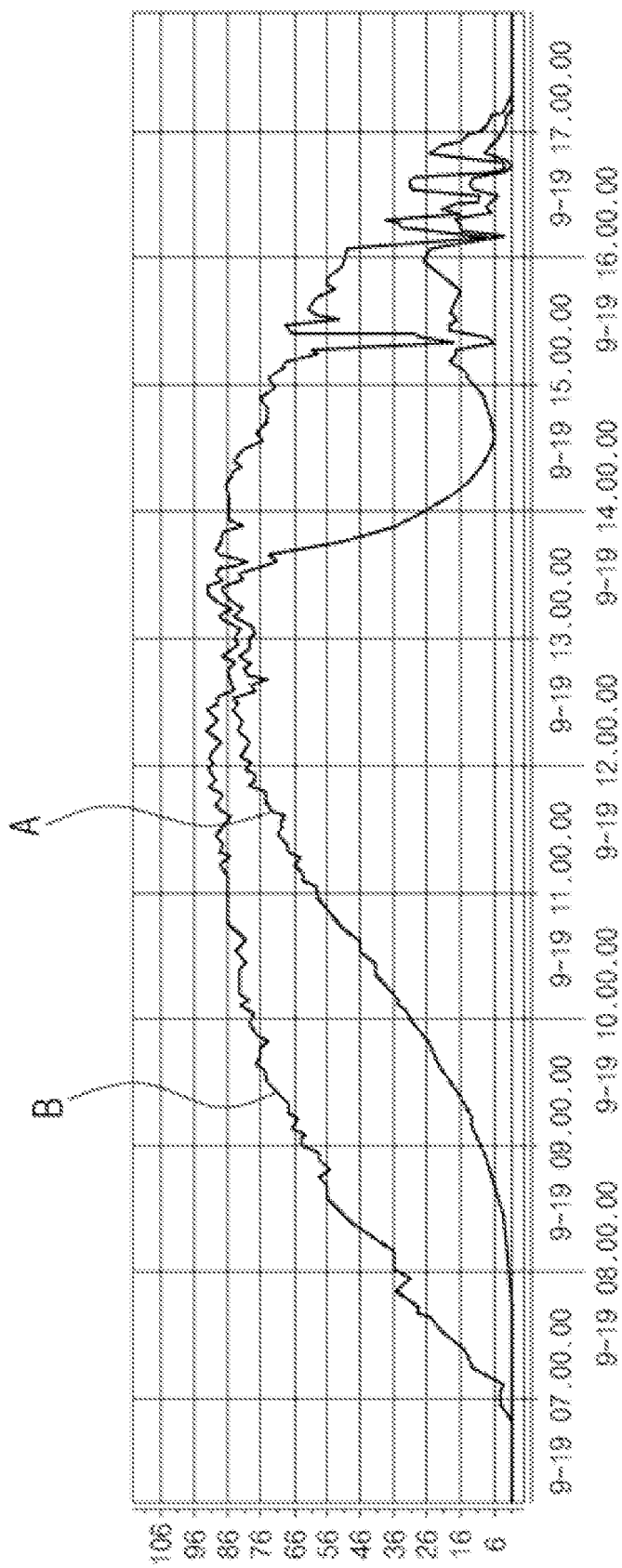

FIG. 10 is a graph showing the result of test 6 for comparing the efficiency in transmitting DC electric energy between before and after the efficiency increasing apparatus of the present invention is installed.

Referring to the graph of FIG. 10 showing the result of test 6, the maximum capacity of DC transmitted after the efficiency increasing apparatus 200 is used is up to about 91%, except in a rapid current fluctuation section. This maximum capacity of 91% is higher by about 4% than about 87%, which is the maximum DC capacity when the efficiency increasing apparatus 200 is not used. In other words, it can be understood that the DC transmission efficiency was increased by at least 4%.

Figure 11:
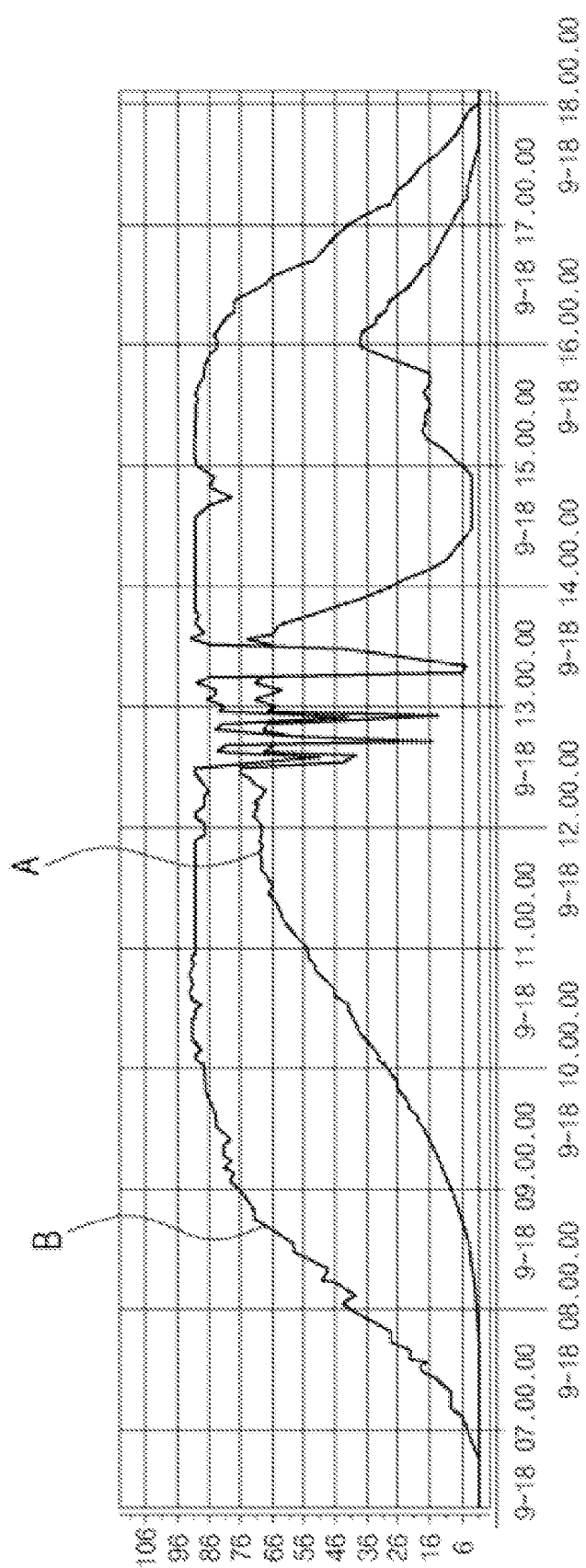

FIG. 11 is a graph showing the result of test 7 for comparing the efficiency in transmitting DC electric energy between before and after the efficiency increasing apparatus of the present invention is installed.

Referring to the graph of FIG. 11 showing the result of test 7, the maximum capacity of DC transmitted after the efficiency increasing apparatus 200 is used is up to about 93%, except in a rapid current fluctuation section. This maximum capacity of 93% is higher by about 20% than about 73%, which is the maximum DC capacity when the efficiency increasing apparatus 200 is not used. In other words, it can be understood that the DC transmission efficiency was increased by at least 20%.

Furthermore, referring to FIGS. 5 through 11, when the average capacity of DC transmitted after the efficiency increasing apparatus 200 is installed is compared with the average DC capacity when the efficiency increasing apparatus 200 is not used, it can be understood that the average DC capacity when the efficiency increasing apparatus 200 is used was increased by about 10%.

As described above, the present invention uses techniques pertaining to transmission of electric current and controlling electrons that are the essence of electric current, rather than development of a coating technique or a technique pertaining to a module or material, and makes it possible to enhance the efficiency in use of power without changing the existing equipment, thus minimizing loss of power on a power line when DC electric energy is transmitted.

The invention claimed is:

1. An apparatus for increasing efficiency in transmitting direct electric (DC) energy in a DC electric energy transmission system, the apparatus comprising a voltage stabilizer,
    the voltage stabilizer comprising:
        a wire connected to a power line for transmitting the DC electric energy;
        an electrical substance encircling the wire;
        an electromagnetic-field generating coil encircling the electrical substance at regular intervals in a direction perpendicular to the wire, the electromagnetic-field generating coil being connected to the wire;
        a voltage-stabilization circuit unit stabilizing voltage of the DC electric energy input into the apparatus before outputting the DC electric energy; and
        a connector connecting the power line to the wire.

2. The apparatus of claim 1, wherein the electrical substance is made of a semiconductor and has a positive charge in an electromagnetic field formed by the electromagnetic-field generating coil, the electrical substance making distribution of electrons in the wire uniform, thus stabilizing transfer of electric current flowing through the wire and the power line.

3. The apparatus of claim 1, wherein the voltage stabilizer stabilizes the electromagnetic field formed by the electromagnetic-field generating coil and stabilizes vibration of electrons due to spins of the electrons by means of the electrical substance, thus stabilizing transfer of the electrons and increasing efficiency in transmitting the DC electric energy.

4. The apparatus of claim 1, wherein the voltage-stabilization circuit unit comprises:
    a voltage discrimination unit discriminating voltage of the DC electric energy input to the apparatus between a higher voltage than a preset reference voltage and a lower voltage than the reference voltage;
    a voltage conversion unit configured such that when the voltage is higher than the reference voltage, the voltage is dropped to a level equal to a level of the reference voltage, and when the voltage is lower than the reference voltage, the voltage is raised to the level equal to the level of that of the reference voltage; and
    a stabilized-voltage output unit configured such that when the voltage converted by the voltage conversion unit falls outside a predetermined range of the reference voltage, the voltage is returned, and when the voltage transformed by the voltage conversion unit falls within the predetermined range of the reference voltage, the voltage is output.

5. The apparatus of claim 1, wherein the voltage stabilizer comprises an upper voltage stabilizer and a lower voltage stabilizer, wherein the upper voltage stabilizer and the lower voltage stabilizer have same charge and polarity as each other.

6. The apparatus of claim 4, wherein
    the voltage discrimination unit comprises a condenser and a resistor and uses a potential difference to discriminate an input voltage of the DC electric energy,
    the voltage conversion unit comprises a first transformer and controls the first transformer to raise the voltage when the input voltage of the DC electric energy is lower than the reference voltage and to drop the voltage when the input voltage of the DC electric energy is higher than the reference voltage, and
    the stabilized-voltage output unit includes a second transformer and makes the voltage output from the voltage conversion unit be output as a constant stabilized voltage.

7. The apparatus of any one of claims 1 through 6, wherein the electrical substance comprises an n-p type semiconductor formed by combination of an n-type semiconductor with a p-type semiconductor and controls, using electrical characteristics, the flow of electrons in the wire and the power line, thus outputting a stabilized voltage.

* * * * *